(12) United States Patent
Milanesi

(10) Patent No.: US 11,958,098 B2
(45) Date of Patent: Apr. 16, 2024

(54) METHOD FOR MANUFACTURING A DISC BRAKE DISC

(71) Applicant: BREMBO S.p.A., Curno (IT)

(72) Inventor: Andrea Milanesi, Curno (IT)

(73) Assignee: Brembo S.p.A., Curno Bergamo (IT)

( * ) Notice: Subject to any disclaimer, the term of this patent is extended or adjusted under 35 U.S.C. 154(b) by 164 days.

(21) Appl. No.: 17/596,512

(22) PCT Filed: Jun. 9, 2020

(86) PCT No.: PCT/IB2020/055403
§ 371 (c)(1),
(2) Date: Dec. 13, 2021

(87) PCT Pub. No.: WO2020/250125
PCT Pub. Date: Dec. 17, 2020

(65) Prior Publication Data
US 2022/0314300 A1    Oct. 6, 2022

(30) Foreign Application Priority Data
Jun. 13, 2019   (IT) .................. 102019000008922

(51) Int. Cl.
*B21D 53/26*   (2006.01)
*B23K 9/007*   (2006.01)
(Continued)

(52) U.S. Cl.
CPC .............. *B21D 53/26* (2013.01); *B23K 9/007* (2013.01); *F16D 65/125* (2013.01);
(Continued)

(58) Field of Classification Search
CPC ................. F16D 65/125; F16D 65/128; F16D 2065/1344; B21D 53/26; B23K 9/007
See application file for complete search history.

(56) References Cited

U.S. PATENT DOCUMENTS 3,486,218 A * 12/1969 Buyze ................... F16D 65/128
                                                        188/218 XL
3,623,579 A * 11/1971 Hendrickson ......... F16D 65/128
                                                        188/71.6
(Continued)

FOREIGN PATENT DOCUMENTS

DE      3432926 A1    3/1986
FR      1580381 A     9/1969
(Continued)

OTHER PUBLICATIONS

European Patent Office, International Search Report, issued in PCT/IB2020/055403, dated Jul. 29, 2020, Rijswijk, Netherlands.

*Primary Examiner* — Jason L Vaughan
(74) *Attorney, Agent, or Firm* — Marshall & Melhorn, LLC

(57) ABSTRACT

A method for manufacturing a brake disc includes providing at least one sheet of predefined thickness, blanking a first disc-shaped portion in the at least one sheet adapted to make a first plate of a ventilated braking band, blanking a second disc-shaped portion in the at least one sheet adapted to make a second plate of the ventilated braking band, blanking a third portion in the at least one sheet adapted to make at least one ventilation spacer for the ventilated braking band, drawing the third portion by shaping first and second protrusions, forming opposite first and second recesses adapted to make ventilation channels, connecting the first disc-shaped portion to the first protrusion by discontinuous weld spots, and connecting the second disc-shaped portion to the second protrusion by discontinuous weld spots.

15 Claims, 16 Drawing Sheets

(51) Int. Cl.
*F16D 65/02* (2006.01)
*F16D 65/12* (2006.01)

(52) U.S. Cl.
CPC .... *F16D 65/128* (2013.01); *F16D 2065/1344* (2013.01); *F16D 2200/0021* (2013.01); *F16D 2200/003* (2013.01); *F16D 2250/0023* (2013.01); *F16D 2250/0076* (2013.01); *F16D 2250/0084* (2013.01); *F16D 2250/0092* (2013.01)

(56) References Cited

U.S. PATENT DOCUMENTS

| | | | | |
|---|---|---|---|---|
| 3,730,304 | A | * | 5/1973 | Buyze .................. F16D 65/128 188/71.6 |
| 5,306,890 | A | | 4/1994 | Minamida et al. |
| 2010/0206675 | A1 | * | 8/2010 | Miyake .................. F16D 65/12 188/218 XL |
| 2013/0284549 | A1 | * | 10/2013 | Rudoy .................. F16D 65/128 188/218 XL |
| 2017/0097058 | A1 | | 4/2017 | Nakakura et al. |

FOREIGN PATENT DOCUMENTS

| | | |
|---|---|---|
| FR | 2927389 A1 | 8/2009 |
| GB | 2437745 A | 11/2007 |

* cited by examiner

METHOD FOR MANUFACTURING A DISC BRAKE DISC

CROSS-REFERENCE TO RELATED APPLICATIONS

This application is a National Phase Application of PCT International Application No. PCT/IB2020/055403, having an International Filing Date of Jun. 9, 2020 which claims priority to Italian Application No. 102019000008922 filed Jun. 14, 2019, each of which is hereby incorporated by reference in its entirety.

FIELD OF THE INVENTION

The present invention relates to a braking band and to a disc for ventilated disc brake, as well as to a method for manufacturing said braking band.

PRIOR ART

In a disc brake, the brake caliper is generally arranged straddling the outer peripheral margin of a brake disc, adapted to rotate about a rotation axis (A-A) defining an axial direction (X-X). In a disc brake, a radial direction (R-R), arranged substantially orthogonal to said axial direction (X-X), and a tangential (C-C) or circumferential direction (C-C), orthogonal to both said axial direction (X-X) and said radial direction (R-R), is further defined.

As known, discs for disc brake comprise a bell or a supporting portion, adapted to associate the disc with a hub of a vehicle, from which an annular portion, named a braking band, extends, which is intended to cooperate with pads of a caliper In case of discs of ventilated type, the braking band is made by means of two plates respectively facing and connected to each other by means of connecting elements, respectively, e.g. in the shape of pillars or fins. The outer surfaces of the two plates define opposite braking surfaces, while the inner surfaces, together with the pillars or fins, delimit ventilation channels for cooling the disc, crossed by airflows according to a centrifugal direction during the rotary motion of the disc itself.

Said braking band is intended to cooperate with disc brake calipers adapted to apply a braking action on the vehicle by applying, by means of pads, friction on opposite surfaces of the two plates, named braking surfaces.

It is known that during the operation of the brakes, the friction between the pads of the brake calipers and the braking surfaces of the braking band generates a high amount of heat which requires disposal.

The heat generated indeed causes several undesired phenomena, such as, for example, the deformation of the braking band, the formation of cracks on the braking surfaces or localized transformations of state of the material forming the braking band, which in turn result in the deterioration of the braking band itself.

In applications on high-performance motor vehicles with an increased braking efficiency, in particular, there is much energy to be disposed of, and the aforesaid need to dispose of the heat generated during the braking action is even more felt.

Ventilated discs of the type mentioned above have undergone a continuous evolution over time, in particular concerning the number and shape of the so-called ventilation channels, thus defining the gap formed by the two plates axially facing each other.

It is also known that the braking action provided by the pads against the braking surfaces of the disc generate heat, consequently an increase of temperature of the disc to the extent of making the disc itself incandescent in the case of particularly demanding performance. The disc is deformed and the contact between the pads and the braking surfaces deteriorates due to the increased temperature reached by the disc during the braking. Furthermore, the friction material of the pads undergoes a kind of vitrification and pollution by the disc material.

To obviate the above-disclosed drawbacks, the need in the field is particularly felt, on the one hand, to increase the efficiency of the dispersion of the heat generated by the braking to contain the temperatures reached by the disc during and following the braking, and the need on the other hand to increase the mechanical resistance of these middle portions of the braking band.

However, it is worth noting that ventilated discs of the type mentioned do not per se provide a solution to a further problem which may affect the disc brakes, in particular, disc brakes with ventilated discs, arising simultaneously to the problem mentioned above and which is to be resolved at the same time. The problem is briefly described hereinbelow.

In particular, the need is felt to provide discs of disc brake of the ventilated type also for mass-produced car or motorcycle applications, in which the braking band is obtained by blanking a steel sheet, e.g. by blanking and shaping two plates which are then joined together by gluing or brazing.

Solutions of this type are known from DE3432926A1 and US2017097058.

It is also known to use two plates of blanked sheet with interposed fins or spacer rings and joined together by brazing.

A solution of this type is known from GB2437745.

Although these known solutions are adapted to large production volumes, they only make it possible to obtain products with low mechanical characteristics and susceptible to corrosion because the brazing process substantially deteriorates the entire area of the brake band plates intended for interaction with the brake pads and is used with low-melting alloys, which are subject to corrosion. Additionally, these known solutions create a braking band structure, which is strongly preloaded or biased by the effects of welding distributed over large surfaces with areas of mutually different mass and thermal and mechanical resistance. These effects often lead to the need for long and expensive heat treatment processes on brazed parts and consequent machining with deep chip removal that make the entire production process very laborious and sometimes expensive.

Similar solutions are known from U.S. Pat. No. 3,730,304 and US2013284549.

Solutions are known in which individual spacers are placed between the plates and then connected to them by brazing the entire band (as in FR2927389), or solutions in which a shaped spacer is welded to the plates (as in U.S. Pat. No. 3,623,579, and also U.S. Pat. No. 3,486,218). In particular, these solutions have the shaped spacer welded along lines creating two types of problems. The first is in that a welding line extended for the entire braking band height creates circumferentially variable or cyclic structural discontinuities which drastically increase the wear unevenness of the pad friction material, generating abnormal wear and particularly annoying noise during the braking actions of the vehicle. The second resides in that the unevenness of mechanical features given by the welding in which in the welding lines the material is harder but also more fragile, increasing the unevenness of wear of the pads even further and also anomalous and uneven wear of the disc itself, creating the need to replace the discs long before their actual end of life.

Therefore, there is the need for new ventilated disc structures which can offer particularly efficient cooling performance during the step of braking, but also ease of production at the same time. In particular, the need remains strongly felt to extend the use of disc brake discs obtained by blanking from a sheet of metal to heavy applications from a mechanical and, above all, thermal point of view, using an efficient and cost-effective industrial process.

The aforesaid known examples of ventilated discs and respective braking bands are not capable of adequately meeting all the strongly desired requirements mentioned.

The problem underlying the present invention is thus to provide a braking band and a disc for brake disc, which have structural and functional characteristics such to satisfy the aforementioned requirements and, at the same time, solve the drawbacks mentioned with reference to the prior art.

Solution

It is the object of the present invention to provide a braking device in which the trend to create these waves and consequent squeals, is reduced.

This and other objects and advantages are achieved by a method for manufacturing a brake disc, a disc brake disc and a system for implementing the aforesaid method as described and claimed herein.

Some advantageous embodiments are the object of the dependent claims.

An analysis of this solution has shown that the suggested solution allows a much greater braking comfort to be achieved with respect to the solutions of the prior art despite using discs of material blanked from sheet.

Furthermore, the suggested solution maintains a very high cooling efficiency of the disc.

In particular, by virtue of the suggested solutions is it possible to extend the use of disc brake discs obtained by blanking from at least one sheet of metal to heavy applications from a mechanical and, above all, thermal point of view, using an efficient and cost-effective industrial process.

The new suggested solutions make it possible to produce lightweight and corrosion-resistant discs with high mechanical strength and a longer life with much more uniform wear than the solutions of the known art.

FIGURES

Further features and advantages of the device, of the brake disc and of the vehicle will be apparent from the following description of preferred embodiments thereof, by way of non-limiting examples, with reference to the accompanying figures, in which:

FIG. 1 is an axonometric view of a disc brake disc in which the bell is obtained by drawing the central part of a blanked sheet disc; in this embodiment, the plates are welded to a ventilation spacer in points mutually spaced apart and discreet and by means of at least one electrode (e.g. by capacitive spot welding) which accesses the opposite plate through special openings in the plate;

FIG. 2 is an axonometric view of a disc brake disc in which the bell is obtained by drawing the central part of a blanked sheet disc; in this embodiment, the plates are welded to a ventilation spacer in points mutually spaced apart and discreet and by means of a plurality of electrodes (or a single electrode with a plurality of welding tips, e.g. by capacitive spot welding) which access the opposite plate (according to the first or second) through a plurality of openings made in the plates;

FIG. 3 is an axonometric view of a disc brake disc in which the bell is obtained by co-fusing a bell on inner radial extensions of a braking band made of components made of blanked sheet; in this embodiment, the plates are welded to a ventilation spacer in points mutually spaced apart and discreet and by means of at least one electrode (e.g. by capacitive spot welding) which accesses the opposite plate through special openings in the plate;

Figure 1:
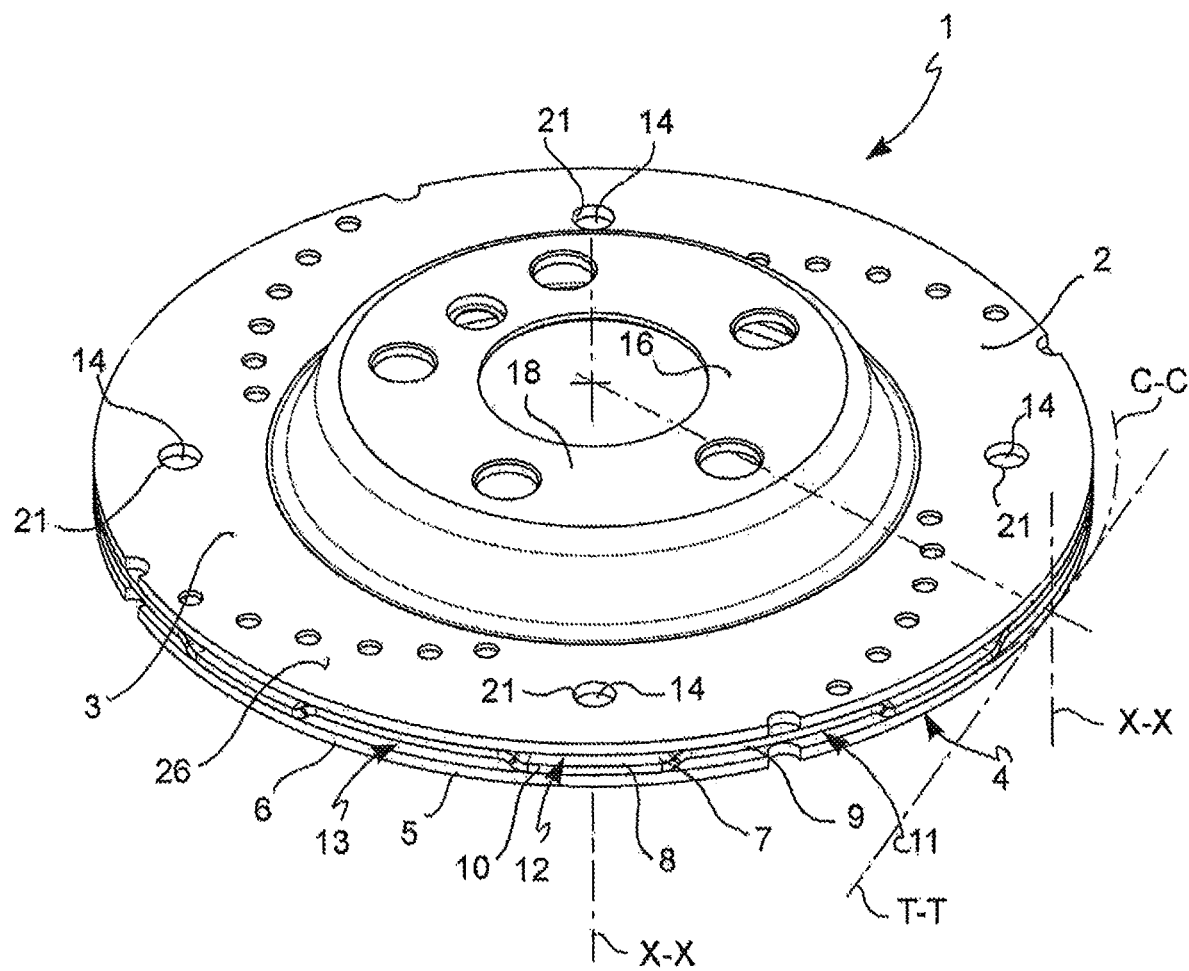
Figure 2:
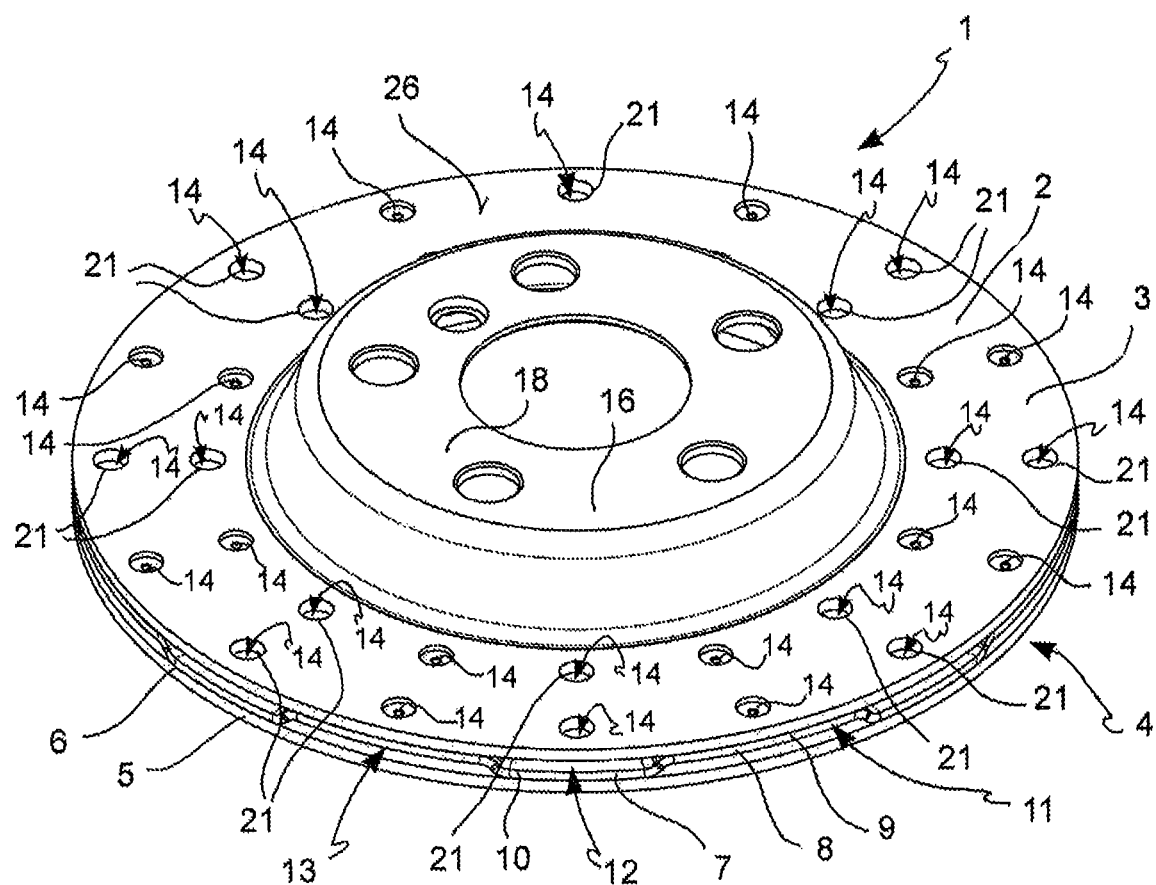
Figure 3:
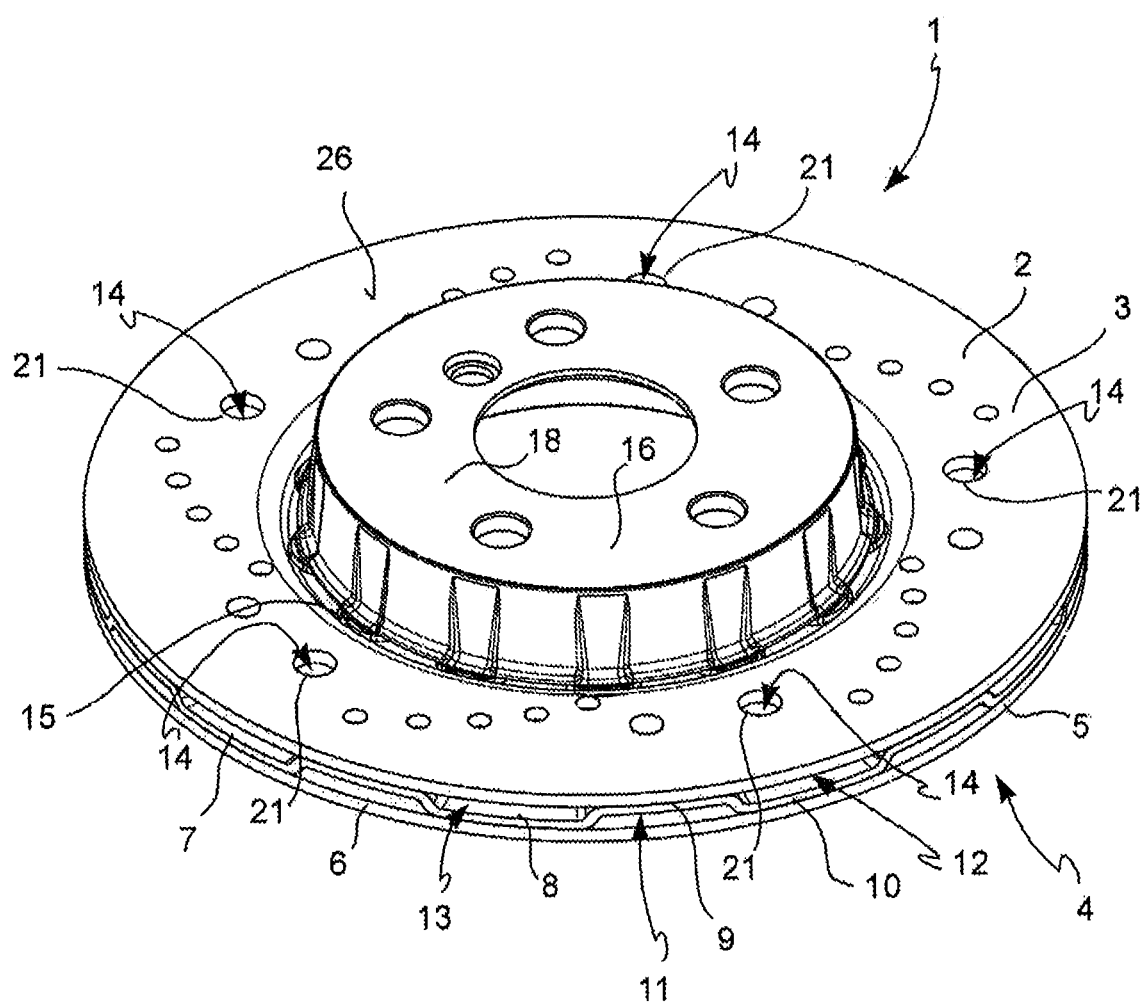
Figure 4:
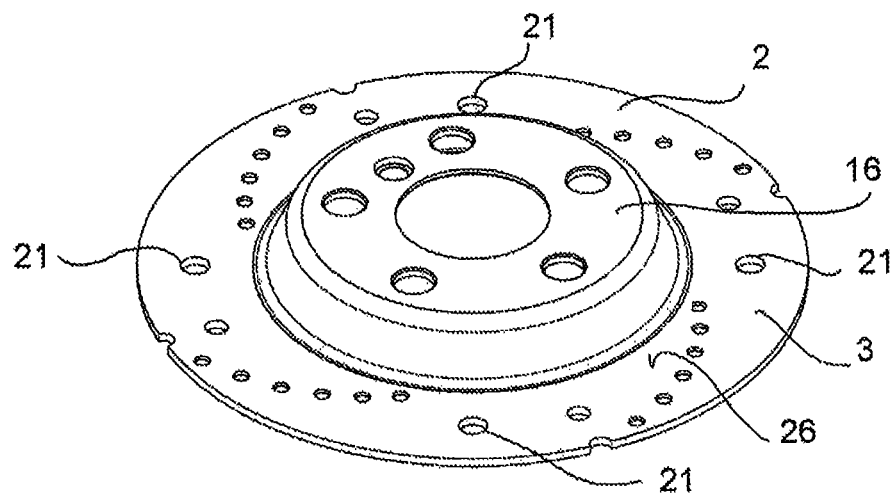
FIGS. 4 to 6 are axonometric views of the three components of a braking band which form the disc of FIG. 1 when assembled and welded together.
Figure 5:
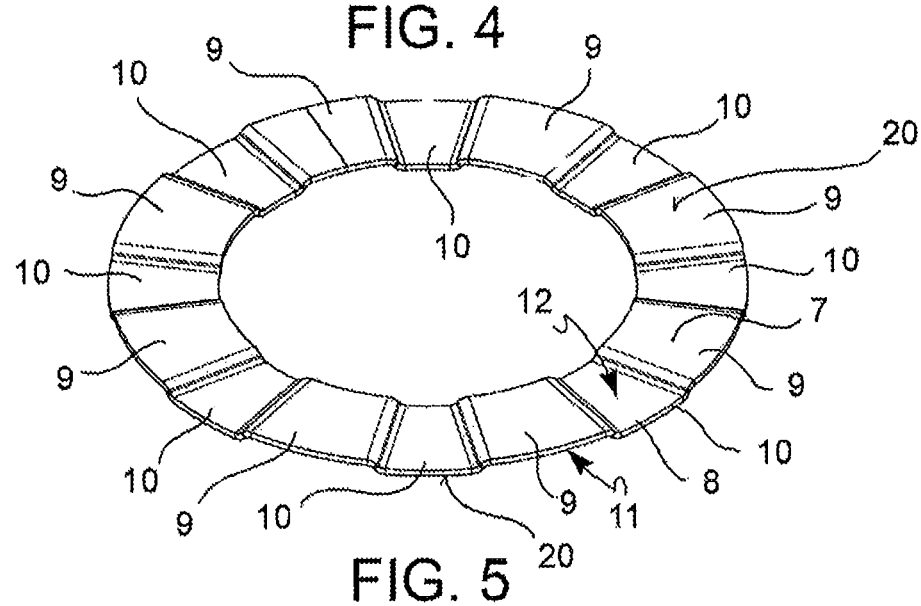
Figure 6:
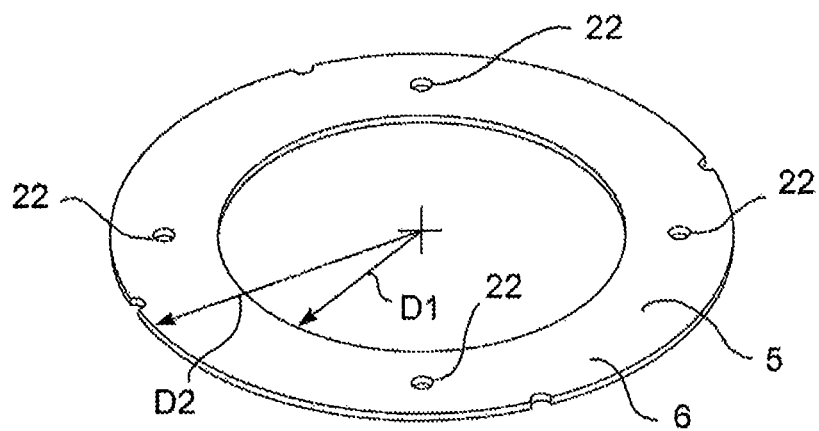
Figure 7:
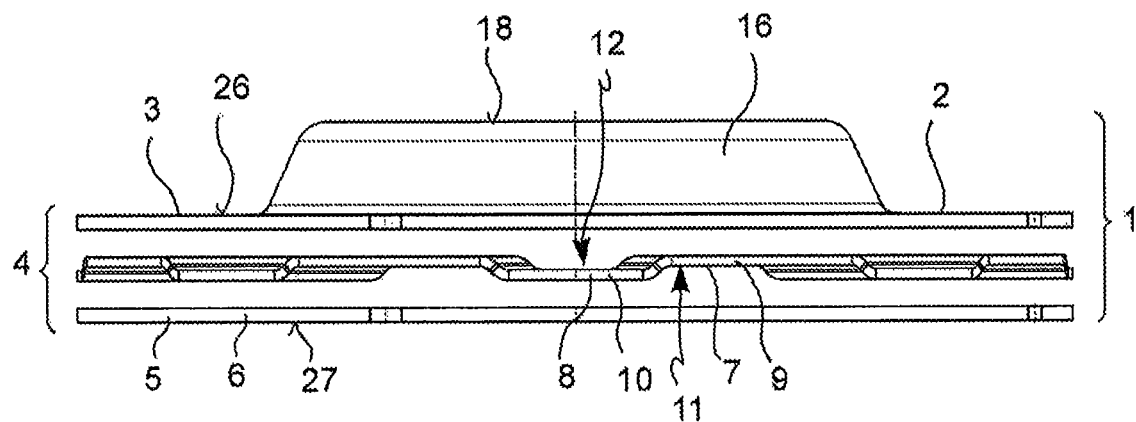
FIG. 7 is a side view of the three components in figures from 4 to 6 mutually superimposed and ready to be arranged side-by-side, aligning the openings adapted to receive the welding electrode with the recesses present in the ventilation spacer.
Figure 8:
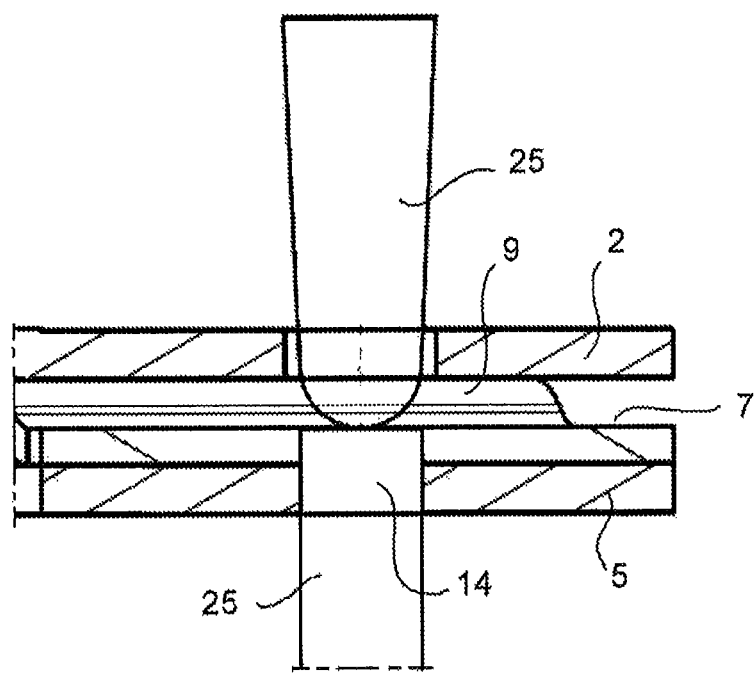
Figure 9:
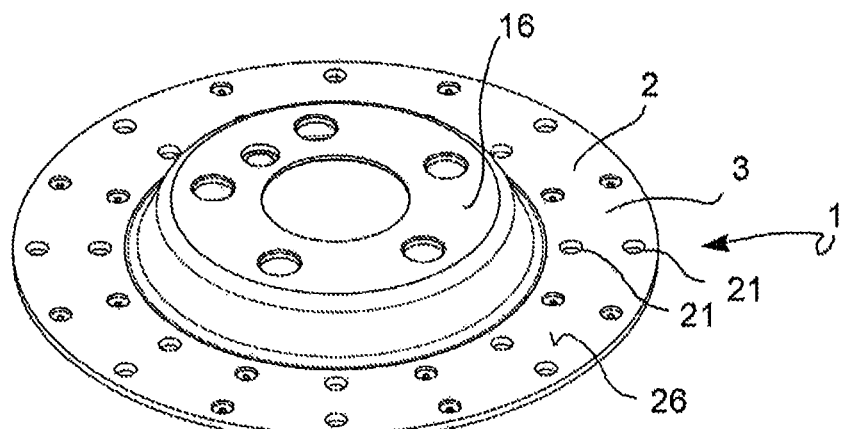
Figure 10:
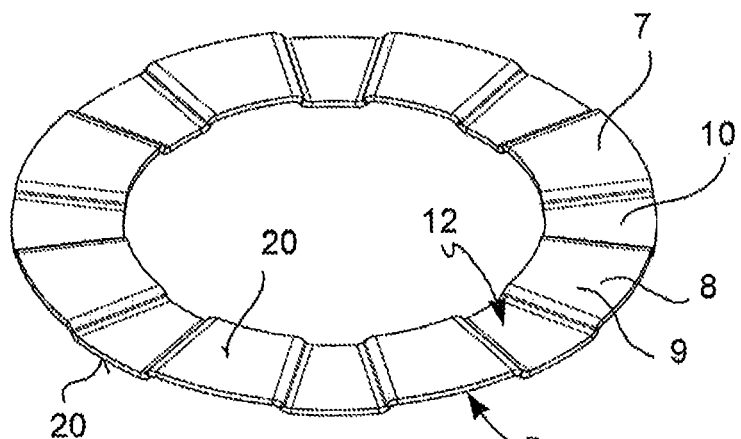
Figure 11:
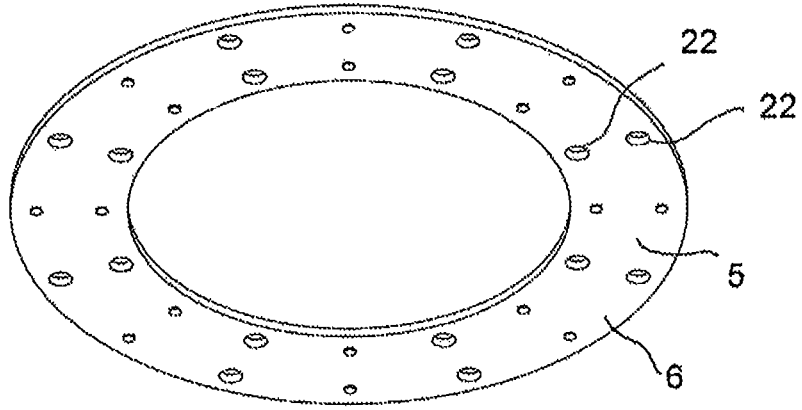
Figure 12:
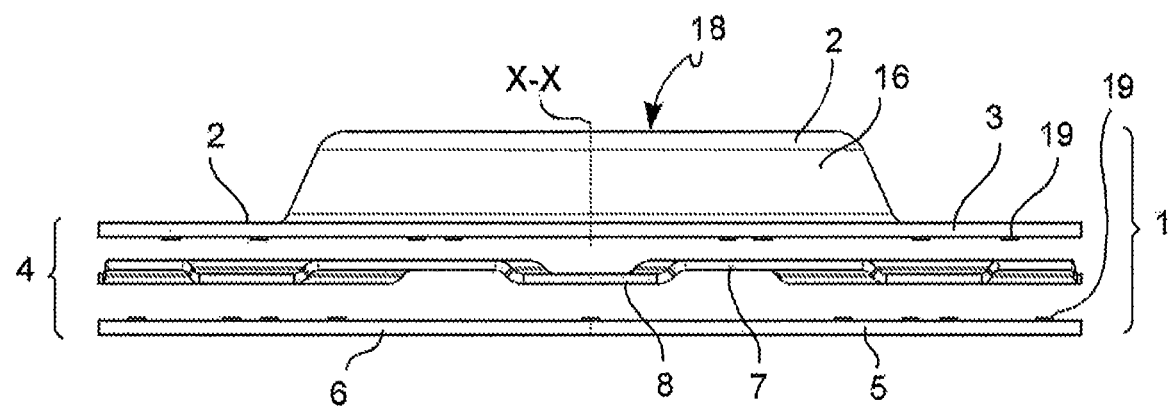
Figure 13:
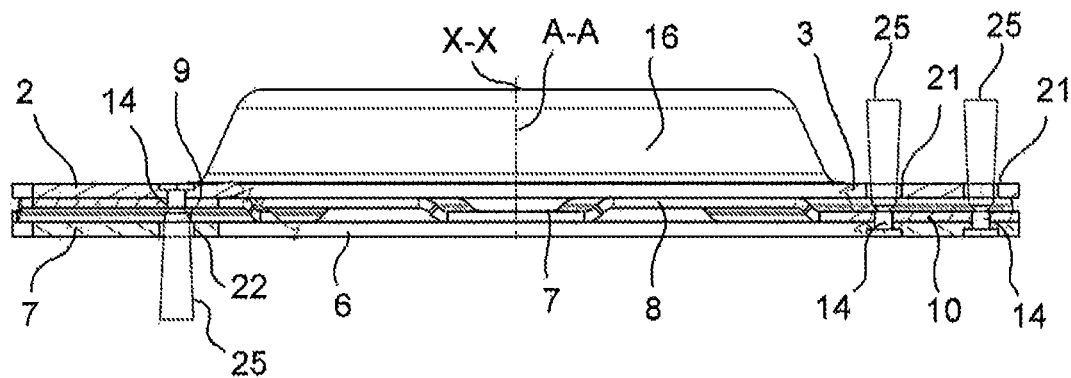
Figure 14:
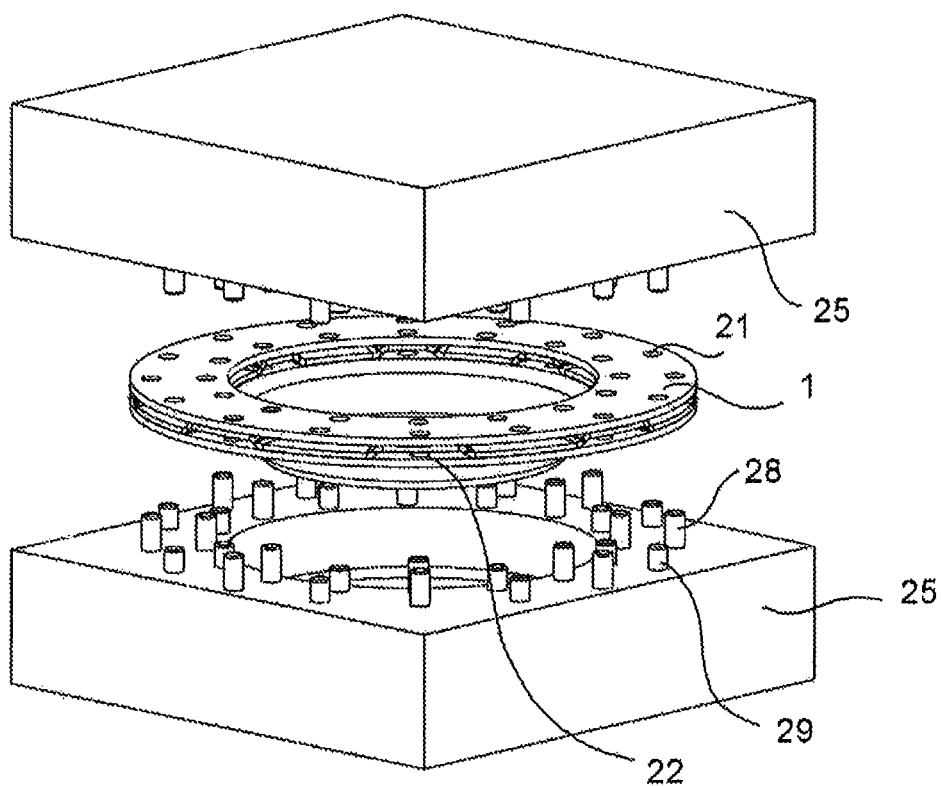
Figure 15:
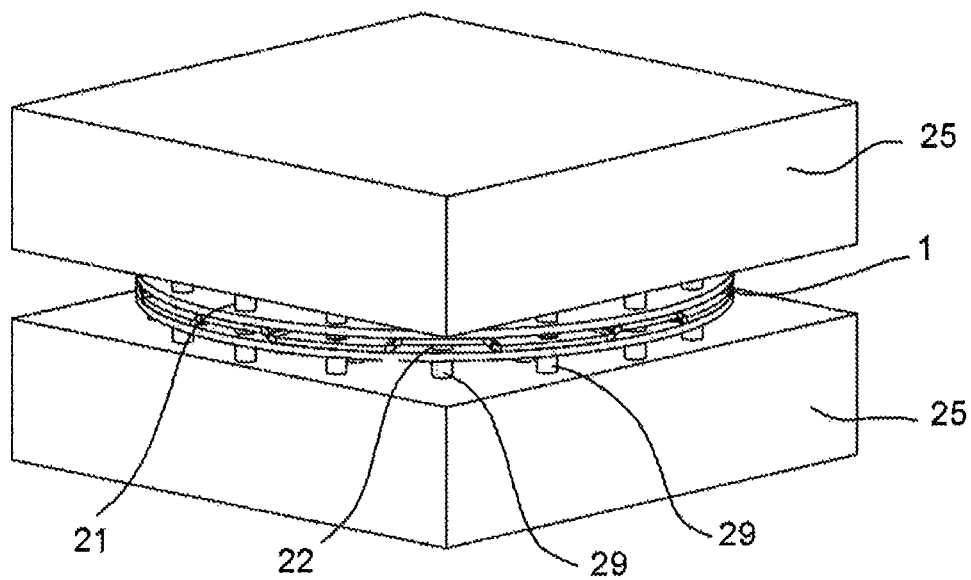
Figure 16:
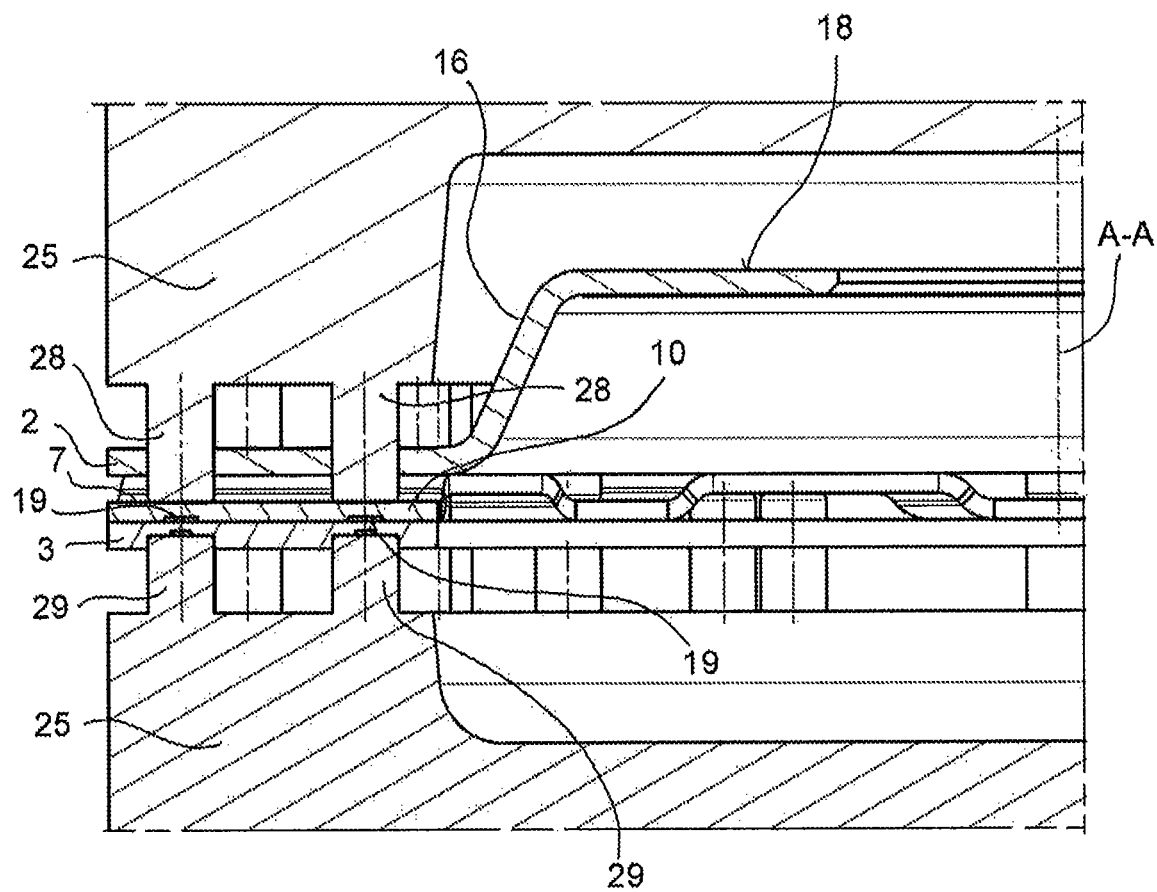
Figure 17:
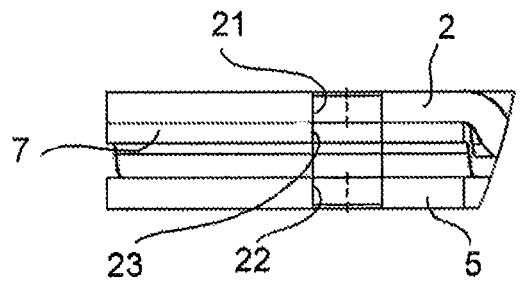
Figure 18:
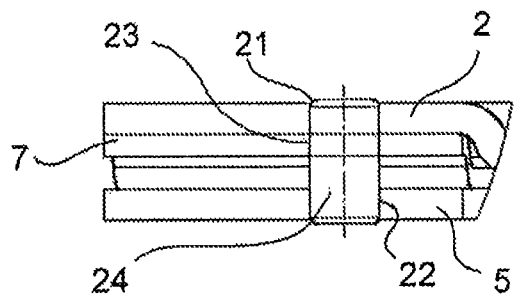
Figure 19:
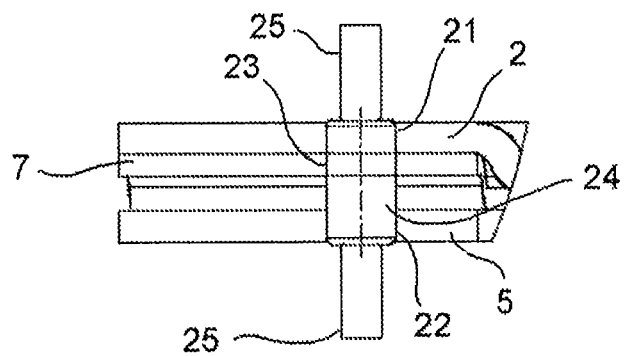
Figure 20:
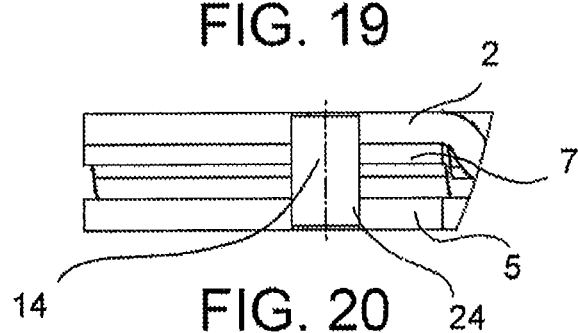
Figure 21:
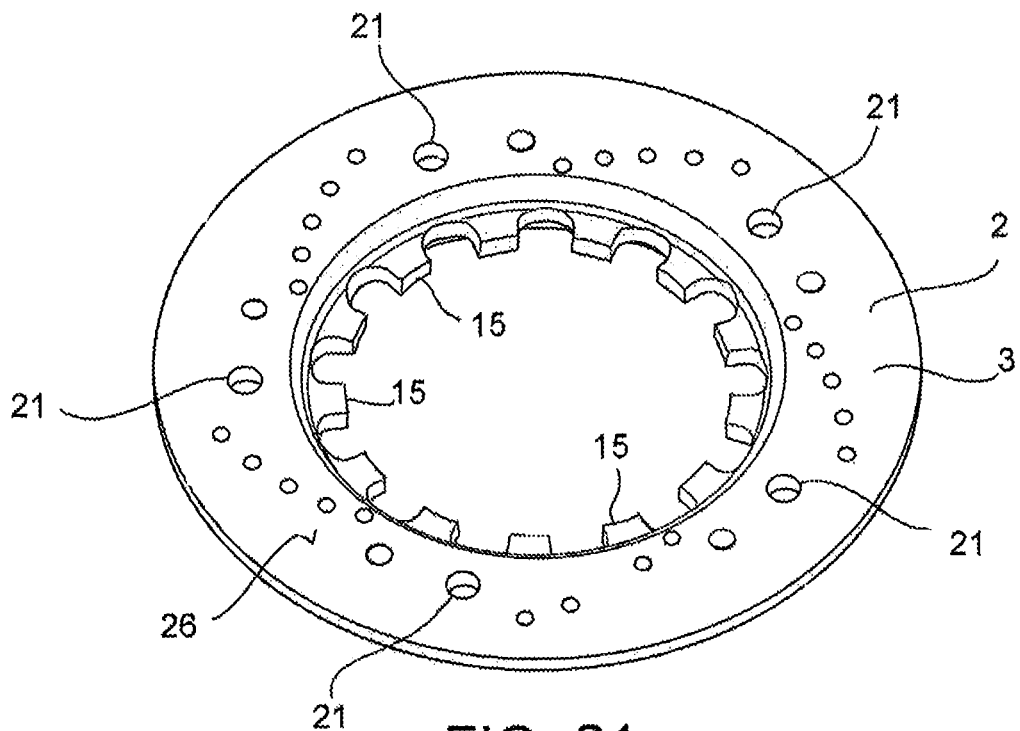
Figure 22:
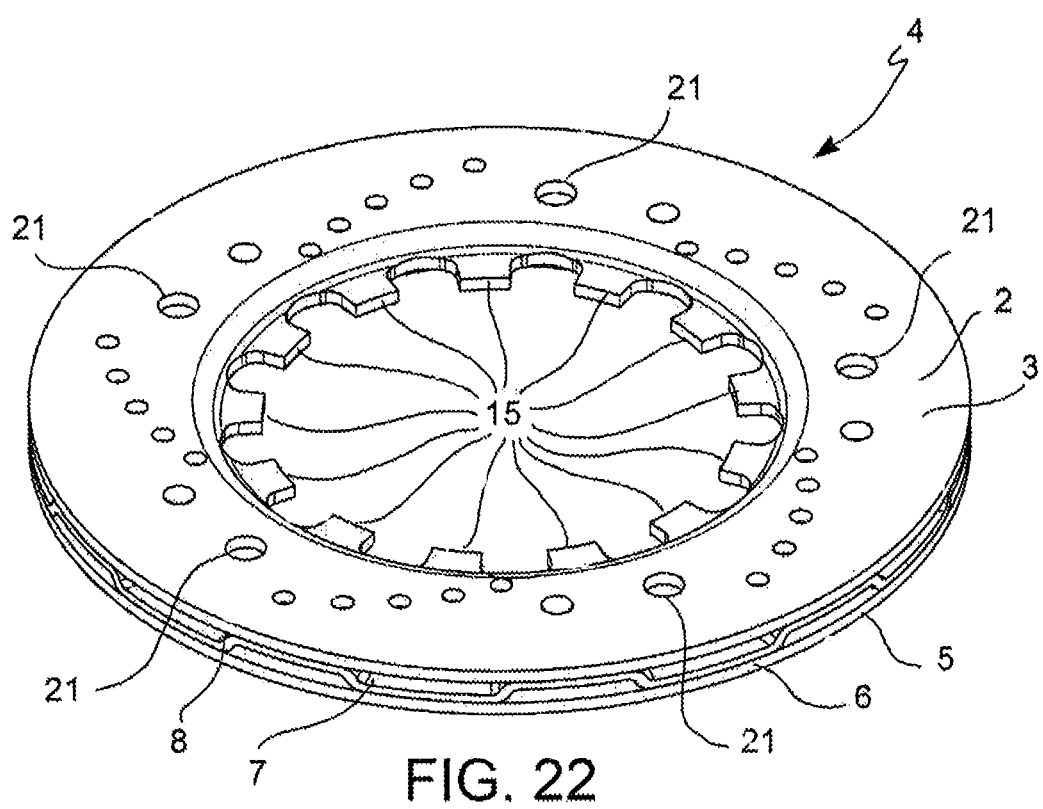
Figure 23:
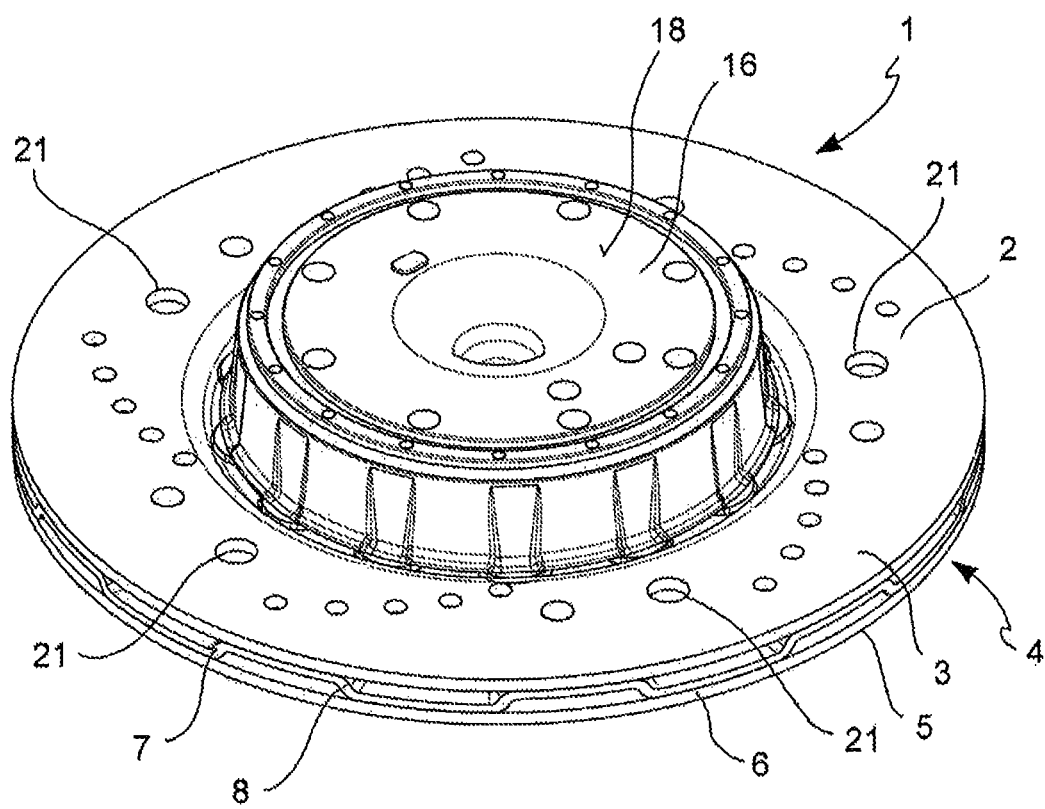
Figure 24:
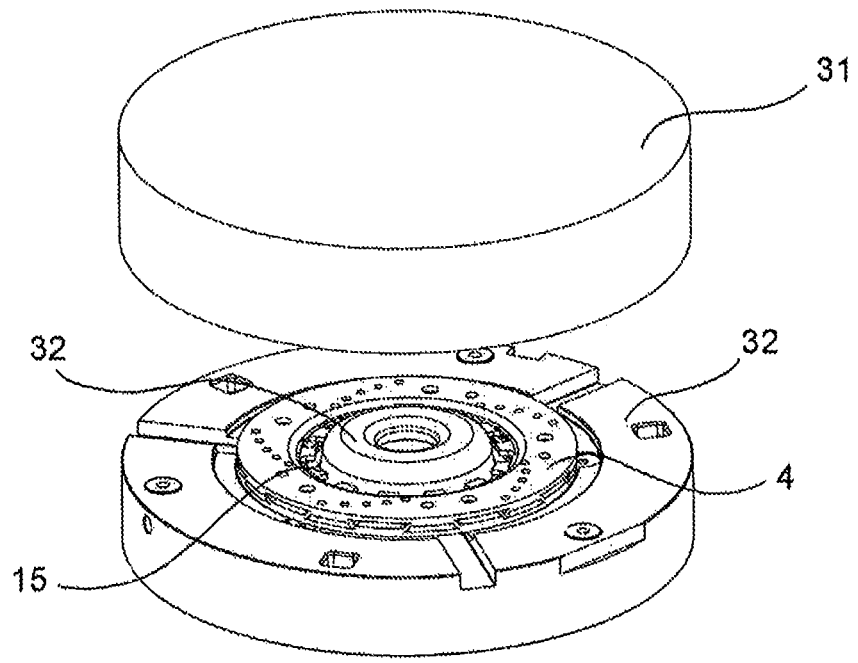
Figure 25:
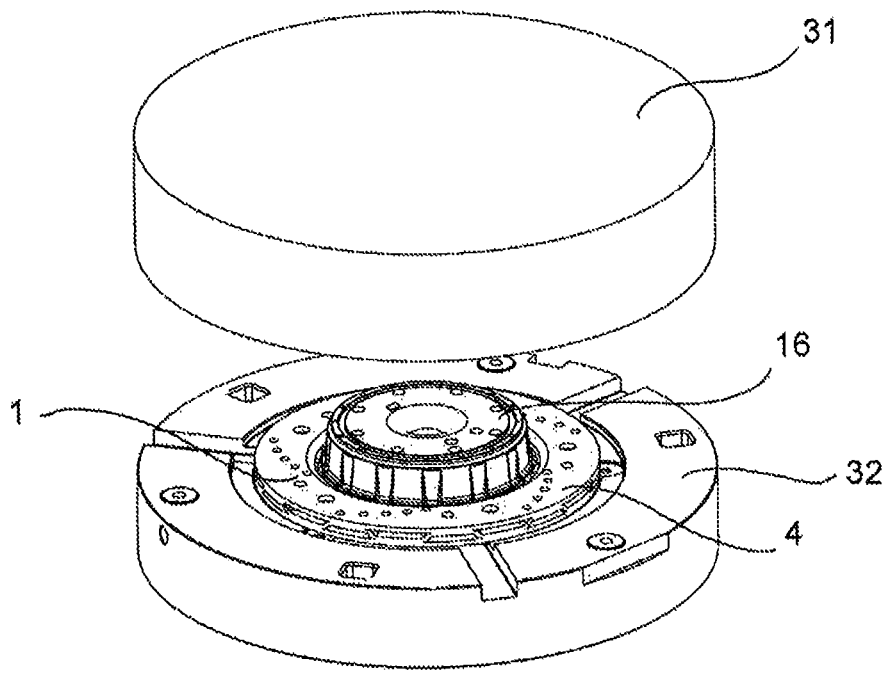
Figure 26:
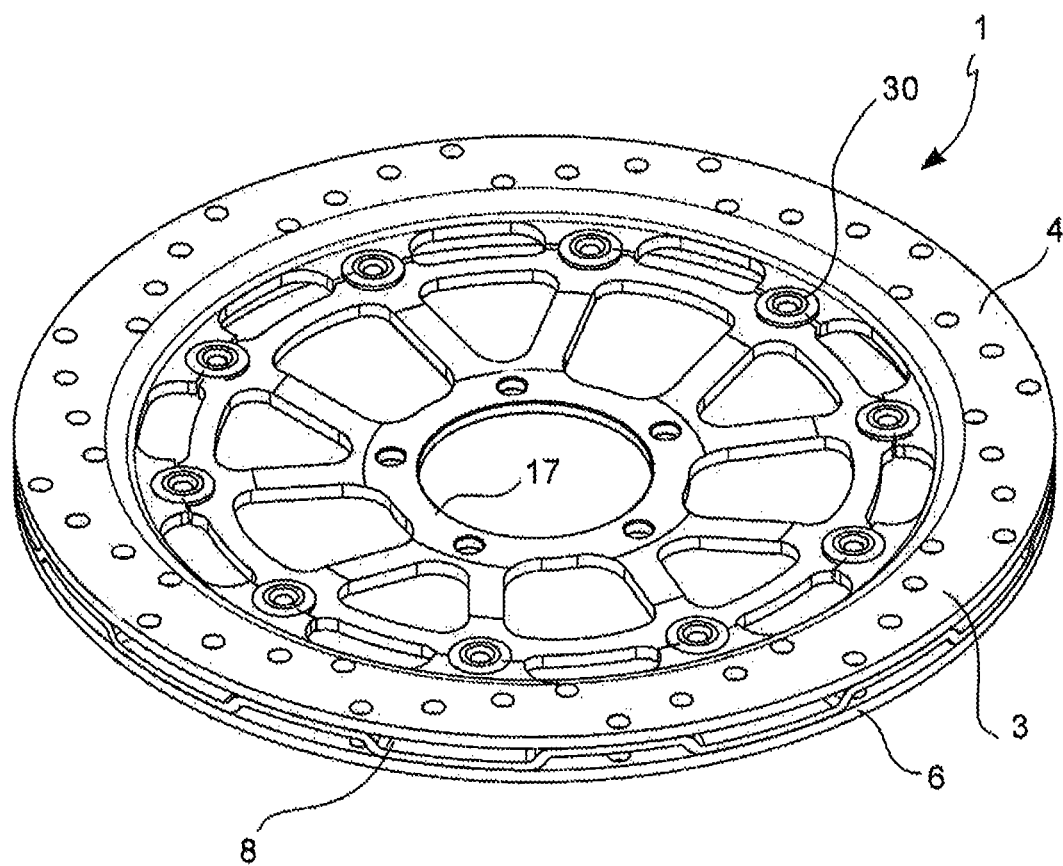
Figure 27:
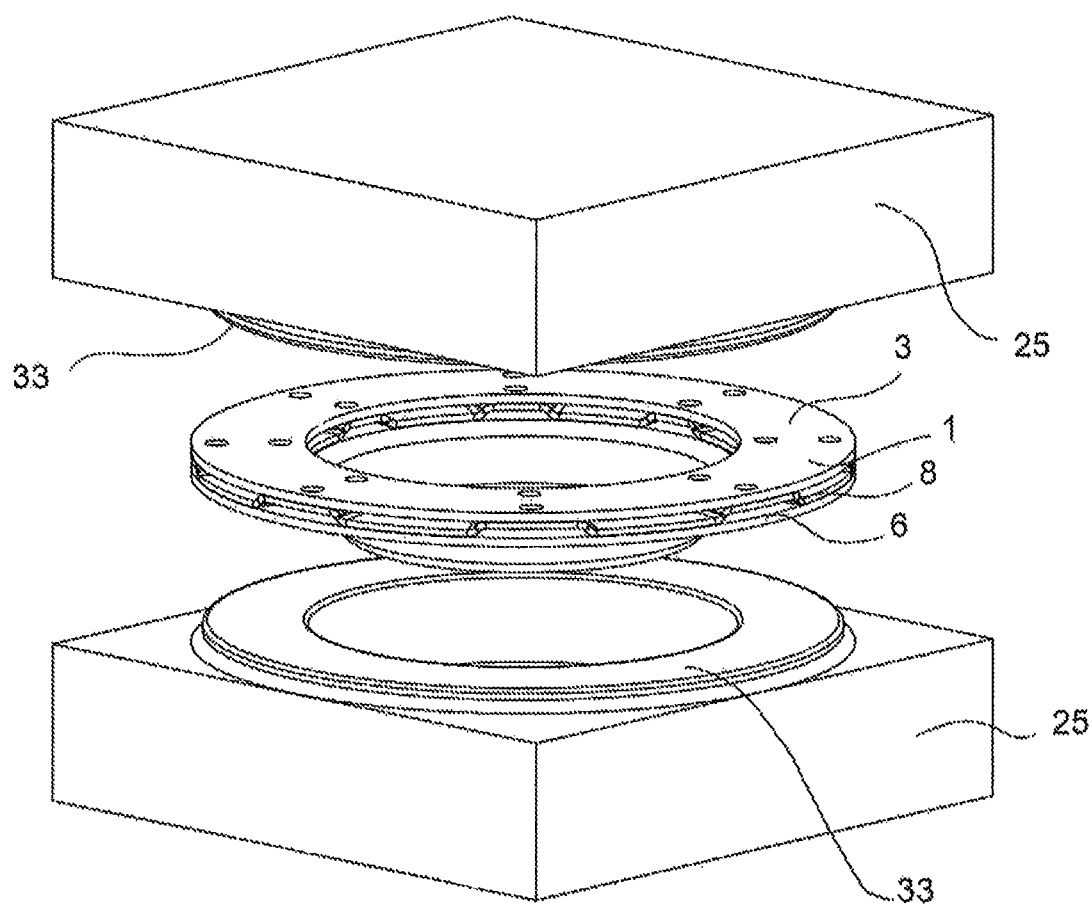
Figure 28:
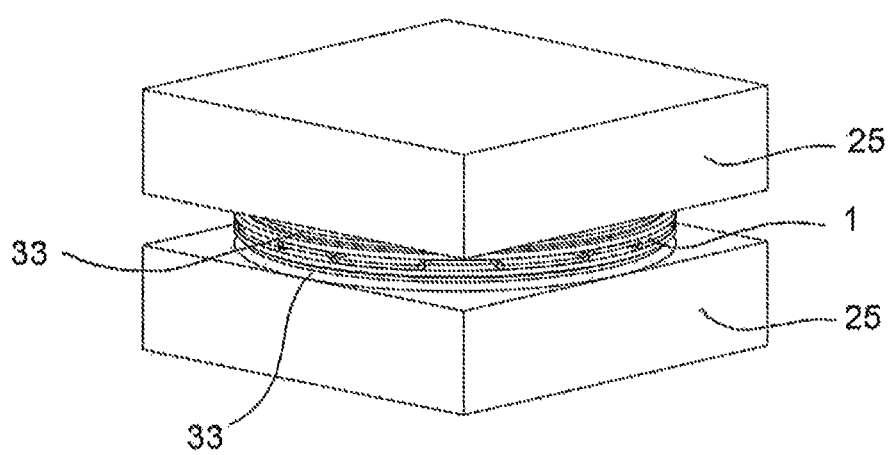
Figure 29:
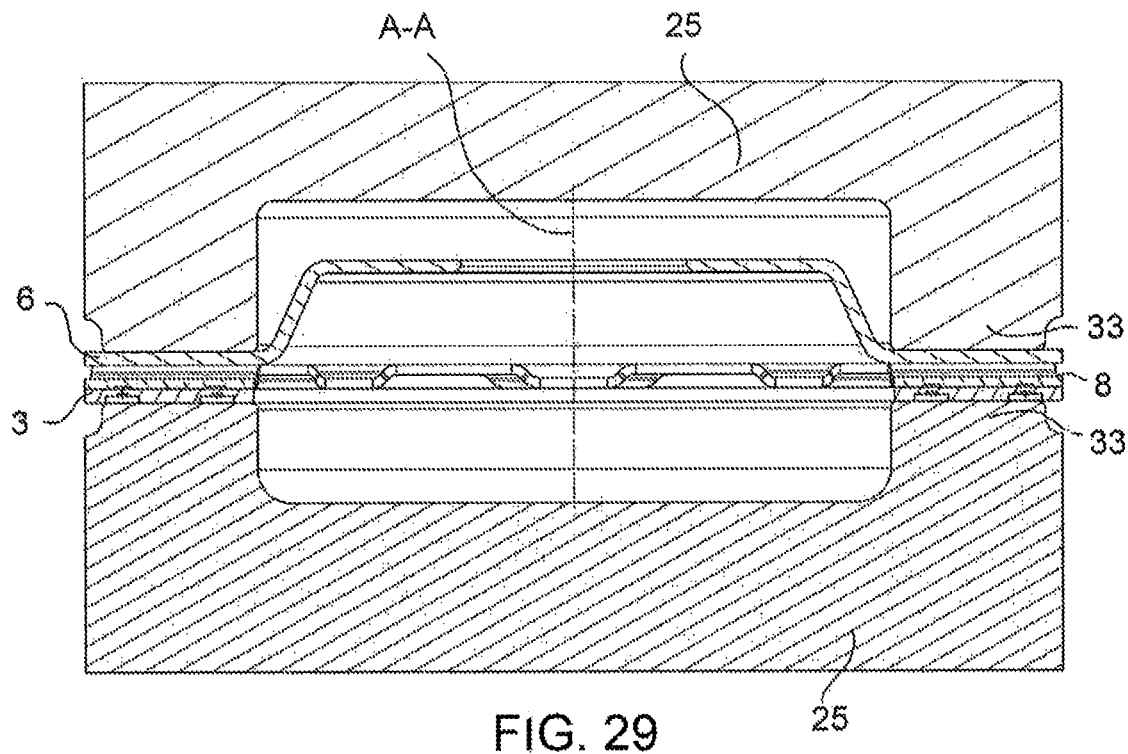
Figure 30:
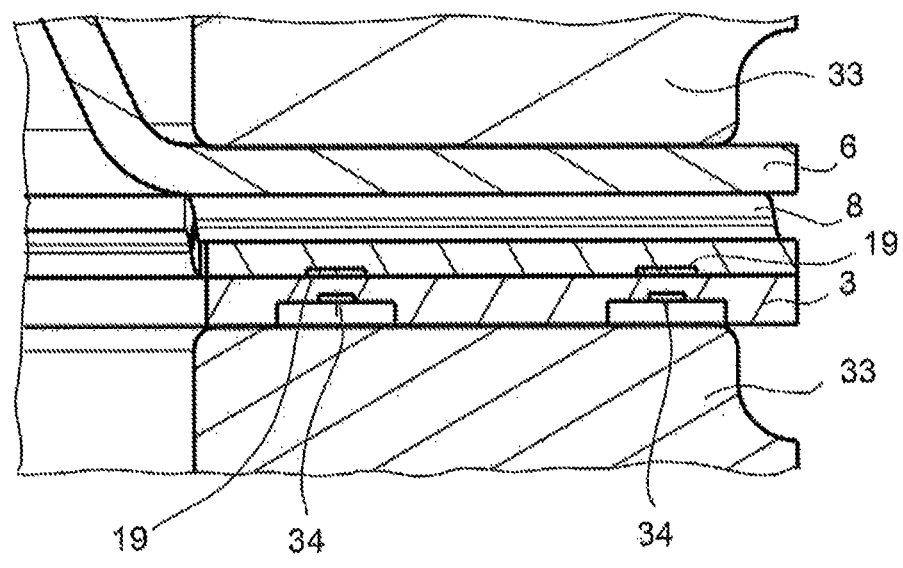

FIG. 8 is a side section view of a detail of the three components of figures from 4 to 6 superimposed and in contact with each other in which a welding electrode enters an opening in a plate to reach the surface delimiting the recess of the ventilation spacer and be ready to weld in a spot, creating a weld spot, said ventilation spacer, at the opposite plate where it rests on the corresponding protrusion of the ventilation spacer;

figures from 9 to 11 are axonometric views of the three components of a braking band which form the disc of FIG. 2 when joined and welded together;

FIG. 12 is a side view of the three components in figures from 9 to 11 mutually superimposed and ready to be placed side-by-side, aligning the openings adapted to receive the plurality of welding electrodes (or the only electrode with the plurality of welding tips) with the recesses present in the ventilation spacer;

FIG. 13 is a side section view of a detail of the three components in figures from 9 to 11 superimposed and in contact in which two opposite welding electrodes (two welding tips of a single first welding electrode on the upper side and a welding tip of a single opposite welding electrode on the lower side are visible in this section) enter plate openings to reach the surfaces delimiting recesses of the ventilation spacer and be ready to weld in a plurality of separate welding spots, by creating separate welding spots, said ventilation spacer at the opposite plate on which it rests on the corresponding protrusions of the ventilation spacer;

FIGS. 14 and 15 are in diagrammatic and axonometric views of two steps of preparing of the welding at the same time of several welding spots, according to FIG. 13, in which the welding tips are visible, a first welding tip 28 of prevalent extension to enter a plate opening and reach the protrusion of the ventilation spacer resting on the opposite plate, and a second welding tip 29 of reduced extension to come into contact with the plate, e.g. in which a 19 hole is made;

FIG. 16 is a side section view of a detail in FIG. 15 requiring two weld spots;

figures from 17 to 20 are a side views of a detail of an assembly of three components of a braking band which form a braking band when assembled and welded together, in which, after making the openings in said plates and in said ventilation spacer, they are aligned with each other to insert a welding stud in each of them and welded to make the three components integral with opposite electrodes placed in contact with said welding stud by locally melting said welding stud and making it integral with said plates and ventilation spacer;

FIG. 21 is an axonometric view of a blanked plate with inner radial extensions for connecting to a bell;

FIG. 22 is an axonometric view of a braking band comprising a plate as shown in FIG. 21;

FIG. 23 is an axonometric view of a disc brake disc with a bell co-fused about said inner radial extensions of the braking band in FIG. 22;

FIGS. 24 and 25 are axonometric views of two steps of the co-stamping process of a bell around the said inner radial extensions of the braking band in FIG. 22, the first in which the braking band is inserted in the die (FIG. 24) and the second in which the die is reopened after co-stamping the bell about the inner radial extensions of the band;

FIG. 26 is an axonometric view of a braking band similar the one in FIG. 22, in which the inner radial extensions 15 have been machined to receive connecting and feeding devices 30 to a support wheel 17 typically for motorcycle applications;

FIGS. 27 and 28 are diagrammatic and axonometric views of two steps of preparing of the welding at the same time of more than one welding spot, according to a variant of embodiment, in which the annular welding plates are visible adapted to rest on the entire extension of the opposite braking surfaces of the plates and to allow them where a boss 19 in made;

FIG. 29 is a cross section view of the axial direction in FIG. 27;

FIG. 30 is a side section view of a detail of figure highlighting the two opposite welding plates or annular electrodes indicated with the reference 33.

DESCRIPTION OF SOME PREFERRED EMBODIMENTS

According to a general embodiment, a braking band 4 of a disc for a disc brake 1 of the ventilated type is provided.

Said braking band 4 extends between an inner diameter D1, near a rotation axis X-X of the braking band 1, and an outer diameter D2, far from said rotation axis X-X. Said rotation axis defines an axial direction X-X.

Said braking band 1 defines a radial direction R-R, which is substantially orthogonal to said axial direction X-X, and a circumferential direction C-C which is orthogonal both to said axial direction X-X and to said radial direction R-R.

Said braking band 1 comprises two plates 3, 6 facing each other.

Said plates 3, 6 comprise inner surfaces, either directly or indirectly facing each other and delimiting a gap, which defines a ventilation conduit 13 for the braking band 4.

Said plates 3, 6 comprising outer surfaces.

Said outer surfaces comprise opposite flat circumferential portions, which form braking surfaces 26, 27. In other words, portions of the outer surfaces cooperate with brake pads housed in a brake caliper to apply a braking action when sandwiched against the braking band 4. The portion of the outer surfaces which is brushed or involved by the pads defines the braking surfaces 26, 27.

Said plates 3, 6 comprise a plate body having an extension in axial direction X-X or plate thickness. In other words, when observed in an axial direction, each plate shows a plate thickness which is given by the thickness in the axial direction of the plate body of the plate 3, 6.

Said plates 3, 6 are joined to each other by heat dissipation elements or connecting elements made by means of a least one ventilation spacer 8.

Said ventilation spacer 8 is shaped as columns and/or ribs or fins which project from one plate towards the opposite plate in the shape of connecting bridges of the plates 3, 6.

For example, said ventilation spacer 8 is made of a single shaped disc with protrusions 9, 10 forming recesses 11, 12. Each protrusion 9, 10 has at its extremity flat portions of protrusion 20, which abut on said plates 3, 6.

The present invention further relates to a manufacturing method.

According to a general embodiment of said method, a method for making a disc brake disc 1. Said method comprises the steps of:

providing at least one sheet of predefined thickness;

blanking a first disc-shaped portion 2 in at least one sheet adapted to make a first plate 3 of a ventilated braking band 4;

blanking a second disc-shaped portion 5 in at least one sheet adapted to make a second plate 6 of said ventilated braking band 4;

blanking a third portion 7 in at least one sheet adapted to make at least one ventilation spacer 8 for said ventilated braking band 4;

drawing said third portion 7 by shaping, along a circular path along said third portion 7, first and second protrusions 9, 10, forming opposite first and second recesses 11, 12 adapted to make ventilation channels 13 for said ventilated braking band 4;

connecting said first disc-shaped portion 2 adapted to make a first plate 3 to said first protrusions 9 by means of discontinuous weld spots 14;

connecting said second disc-shaped portion 5 adapted to make a second plate 6 to said second protrusions 10 by means of discontinuous weld spots 14.

According to an embodiment, at least one sheet is made of steel suited for brake disc applications.

According to an embodiment, said at least one sheet is made of stainless steel suited for brake disc applications.

According to an embodiment, a bell 16 associated with said braking band 4 is provided and wherein said bell is made of a material different from the material of which said braking band is made 4.

According to an embodiment, said bell 16 is made of aluminum.

According to some embodiments, the bell 16 may be made of one of these alternatives:

in co-fused aluminum on inner radial extensions 15 of the braking band 4; or made of aluminum and fitted with small parts, i.e. connection devices 30 to the braking band 4; or steel mounted with small parts, i.e. connection devices 30 to the braking band 4; or steel mounted by deformation (e.g. in accordance with the Blechtopf® solution by the Applicant); or of composite material.

According to an embodiment, at least one of said steps of blanking is a circular crown blanking.

According to an embodiment, at least one of said steps of blanking is a circular crown blanking with inner radial extensions 15 for connecting to a bell 16 for connecting to a stub axle of a vehicle and/or a central feeding and connecting portion to the wheel hub 17.

According to an embodiment, at least one of said steps of blanking is a blanking from a full disc. The step of drawing of a central bell-shaped portion 18 for connecting to a stub axle of a vehicle is provided either at the same time as or after said blanking.

According to an embodiment, the further step of stamping and/or drawing of punctiform portions or bosses 19 in said first and/or second disc-shaped portion 2, 5 and/or ventilation spacer 8 is provided either at the same time or subsequently to said blanking to form recesses and/or raised portions suited for localized and/or spot welding.

The term "boss" refers to a localized variation, i.e. definable as punctiform, of the shape and/or thickness of plate 3 or 6 or the ventilation spacer 8, to create a small empty chamber between plate 3 or 6 and ventilation spacer 8 adapted to create, for example, localized capacitive welding or, for example, the electric arc which allows the creation of a weld spot. By virtue of the prediction that the welding spots will not directly affect the braking surface (i.e. the surfaces which are intended to cooperate with the brake pads) of the plates 3, 6, allowing the creation of a reduced or completely absent geometric and/or structural discontinuity and/or mechanical characteristics of the plates 3, 6.

According to an embodiment, the further step of stamping and/or drawing of bosses 19 in said first and/or second disc-shaped portion 2, 5 and/or ventilation spacer 8 is provided either at the same time or subsequently to said blanking and wherein the step of making said bosses is provided in said points in which the discontinuous spot welding 14 is provided. This type of welding is called projection welding.

According to an embodiment, boss housings 34 are made before or after or at the same time as said further step of stamping and/or drawing of bosses 19 in said first and/or second disc-shaped portion 2, 5 and/or ventilation spacer 8.

According to an embodiment, said first and second protrusions 9, 10 comprise at least some flat end portions 20, wherein the step of placing said first and/or second disc-shaped portion 2, 5 over said at least some flat end portions is provided.

According to an embodiment, said first and second protrusions 9, 10 comprise at least some flat end portions 20, wherein the step of placing said bosses 19 of said first and/or second disc-shaped portion 2, 5 over said at least some flat end portions 20 is provided.

According to an embodiment, the step of making first and/or second passage openings 21, 22 for welding electrodes and/or welding studs is provided either at the same time as or separately from the aforesaid step of blanking of a first and/or second disc-shaped portion 2 in said at least one sheet.

According to an embodiment, making third passage openings 23 for welding studs 24 is provided either at the same time as or separately from said step of blanking of a third portion 7 adapted to make a ventilation spacer 8 in said at least one sheet.

According to an embodiment, said step of connecting said first and/or second disc-shaped portion 2, 5 adapted to make a first and/or second plate 3, 6 to said first and/or second projections 9, by means of discontinuous weld spots 14 provides a step of capacitive spot welding.

According to an embodiment, said step of connecting first and/or second disc-shaped portion 2, 5 adapted to make a first and/or second plate 3, 6 to said first and/or second protrusions 9, by means of discontinuous weld spots 14, provides a step of welding with a pair of annular electrodes or welding plates or annular welding plates 32, adapted to rest on the plates 3, 6 and to create the potential difference adapted to determine the spot welding in the contacts between plates 3, 6 and the ventilation spacer 8 at the bosses 19.

According to an embodiment, said step of connecting said first and/or second disc-shaped portion 2, 5 adapted to make a first and/or second plate 3, 6 to said first and/or second projections 9, by means of discontinuous weld spots 14 provides a step of simultaneous welding with a plurality of welding electrodes 25 which simultaneously make a plurality of said discontinuous weld spots 14.

According to an embodiment, the step of making first and/or second passage openings 21, 22 for welding electrodes 25 is provided either at the same time as or separately from the aforesaid step of blanking of a first and/or second disc-shaped portion 2 in said at least one sheet. and wherein the step of making said at least some welding electrodes 25 enter through said first and/or second passage openings 21, 22 for welding electrodes is provided.

According to an embodiment, approaching the first disc-shaped portion 2 to said portion 7 forming said ventilation spacer 8 and approaching said second disc-shaped portion 5 to said ventilation spacer 8 on the opposite side of said ventilation spacer 8.

According to an embodiment, a further step of placing at least one first welding electrode 25 at said first or second disc-shaped portion 2, 5 is provided.

According to an embodiment, the step of making first or second passage openings 21, 22 for welding studs is provided either at the same time as or separately from the aforesaid step of blanking of a first or second disc-shaped portion 2 in said at least one sheet.

According to an embodiment, the first step of entering with at least one second welding electrode 25 in electrode openings 22, 21 provided in said second or first disc-shaped portion 5, 2, and placing said ventilation spacer 8 said second welding electrode 25 is provided.

According to an embodiment, a further step of connecting said ventilation spacer 8 to said first or second disc-shaped portion 2, 5 with welding spots 14 is provided.

According to a preferred embodiment, said connection is a welding and a capacitance welding.

According to a further embodiment, the following steps are provided of:

approaching the first disc-shaped portion 2 to said portion 7 forming said ventilation spacer 8 and approaching said second disc-shaped portion 5 to said ventilation spacer 8 on the opposite side of said ventilation spacer 8;

the step of making first and second passage openings 21, for welding studs is provided either at the same time as or separately from said step of blanking of a first and second disc-shaped portion 2 in said at least one sheet;

making third passage openings 23 for welding studs 24 is provided either at the same time as or separately from said step of blanking of a third portion 7 adapted to make a ventilation spacer 8 in said at least one sheet; and aligning said first and second and third passage openings 21, 22, 23; and inserting at least one welding stud 24 into each of said aligned openings 21, 22, 23; and approaching said at least one welding electrode 25 to said assembly of first and second disc-shaped portions 2, 5, ventilation spacer 8 and welding studs 24; and connecting by weld spots 14 said ventilation spacer 8 to said first or second disc-shaped portion 2, 5 by means of said welding studs 24; and/or wherein said connection is a welding and a capacitive welding.

According to an embodiment, said welding stud 24 is a sort of nailing of the three parts (first and second disc-shaped portion 2, 5 which sandwich the third portion 7) wherein the welding stud 24 is a nail which is fixed, with or without interference, and kept in position by welding, melting locally the welding stud 24 which is welded to the parts of the first and second disc-shaped portion 2, 5 and third portion with which it is in contact.

According to a further embodiment, the following steps are provided of:
- approaching the first disc-shaped portion 2 to said portion 7 forming said ventilation spacer 8 and approaching said second disc-shaped portion 5 to said ventilation spacer 8 on the opposite side of said ventilation spacer 8;
- the step of making first and second passage openings 21, for welding studs is provided either at the same time as or separately from said step of blanking of a first and second disc-shaped portion 2 in said at least one sheet;
- entering with at least one first welding electrode 25 into electrode openings 21 provided in said first disc-shaped portion 2 and placing said ventilation spacer 8 said second welding electrode 25;
- entering with at least one second welding electrode 25 in electrode openings 22 provided in said second disc-shaped portion and placing said ventilation spacer 8 said second welding electrode 25;
- connecting by weld spots 14 said ventilation spacer 8 to said first and second disc-shaped portion 2, 5; and/or wherein said connection is a welding and a capacitive welding.

According to an embodiment, after said step of connecting by weld spots 14, working said first and second disc-shaped portions 2, 5, to take into tolerance at least one portion of the outer surface of the ventilated braking band 4 whereby forming opposite braking surfaces 26, 27 of the first and second plates 3, 6.

According to an embodiment, a further step of drilling and processing is provided for the bell 16 at least in a surface thereof adapted to cooperate with a supporting stub axle of the brake disc of a vehicle.

According to an embodiment, said machining is a grinding, or fine turning or milling or similar machining, e.g. machining by chip removal and/or grinding.

According to an embodiment, at least one of said steps of blanking is a circular crown blanking to make said second disc-shaped portion 5.

According to a further embodiment, the following steps are provided of:
- at least one of said steps of blanking is a circular crown blanking with inner radial extensions 15 thereby making said second disc-shaped portion 2; and
- approaching the first disc-shaped portion 2 to said portion 7 forming said ventilation spacer 8 and approaching said second disc-shaped portion 5 to said ventilation spacer 8 on the opposite side of said ventilation spacer 8;
- connecting by weld spots 14 said ventilation spacer 8 to said first or second disc-shaped portion 2, 5 thereby making a ventilated braking band 4; and
- inserting said inner radial extensions 15 into a cavity of a die (given by the two half-dies 31 and 32); and
- providing the step of co-casting of a bell 16 which, when solidified, with a peripheral portion thereof embraces at least in part said inner radial extensions 15 so as to connect said bell to said ventilated braking band 4 allowing a radial thermal expansion movement of the ventilated braking band 4 with respect to said bell 16.

The present invention further relates to a disc brake 1 comprising a braking band 4 according to any one of the embodiments described above.

The present invention further relates to a disc for disc brake made according to any one of the manufacturing methods described above.

The present invention further relates to a vehicle comprising a braking band 4 according to any one of the embodiments described above.

The person skilled in the art may make many changes and adaptations to the embodiments described above or may replace elements with others which are functionally equivalent to satisfy contingent needs without however departing from the scope of the appended claims.

Furthermore, the present invention relates to a system for manufacturing a disc brake disc 1 comprising:
- at least one device for feeding at least one sheet of predefined thickness;
- at least one station for blanking a first disc-shaped portion 2 in at least one sheet adapted to make a first plate 3 of a ventilated braking band 4;
- the same or separate station for blanking a second disc-shaped portion 5 in at least one sheet adapted to make a second plate 6 of said ventilated braking band 4;
- the same or further separate station for blanking in a third portion 7 at least one sheet adapted to make at least one ventilation spacer 8 for a ventilated braking band 4;
- a station for drawing said third portion 7 by shaping, along a circular path along said third portion 7, first and second protrusions 9, 10, forming opposite first and second recesses 11, 12 adapted to make ventilation channels 13 for said ventilated braking band 4;
- a station for connecting said first disc-shaped portion 2 adapted to make a first plate 3 to said first protrusions 9 by means of discontinuous weld spots 14;
- the same or separate station for connecting said second disc-shaped portion 5 adapted to make a second plate 6 to said second protrusions 10 by means of discontinuous weld spots 14.

According to an embodiment, a rotary support table is further comprised to control the angular position thereof to support at least said first disc-shaped portion 2 of second disc-shaped portion 5 and interposed ventilation spacer 8 to take the points to be welded into position with respect to at least one welding electrode 25.

According to an embodiment, a welding station with a single electrode is further comprised, wherein several weld spots are made by moving said assembly of first disc-shaped 2 of second disc-shaped portion 5 and interposed ventilation spacer 8.

According to an embodiment, a welding station with a shaped electrode (projection welding) is further comprised, wherein a dedicated electrode is provided with a plurality of welding electrode tips or portions 25 so that the entire component can be welded in a single operation.

According to an embodiment, the welding station provides welding a segment of braking band with a shaped welding electrode tool having a plurality of welding tips, e.g. by repeating the operation multiple segments of braking band 4. For example, by welding segments at 90° with four movements about the axis of the X-X disc, it is possible to fully weld the braking band using less expensive equipment.

According to an embodiment, the welding can be performed by welding the portion which will become the outer plate, or second disc-shaped portion 5, with the third portion 7 which will become the ventilation spacer 8, in a first step of the process, subsequently welding the first portion 2, which will become the inner plate 3, with the outer plate 6 and third portion 7. Alternatively, the first disc-shaped portion 2 is approached to the third disc-shaped portion 7 and the second disc-shaped portion 5 are all welded together at the same time, thus making the braking band 4.

According to an embodiment, said third portion 7 intended to become the ventilation spacer 8, it is made using additive manufacturing techniques and in suitable material to be welded to the first and second disc-shaped portion 2, 5.

LIST OF REFERENCES 1 disc brake disc
2 first disc-shaped portion
3 first plate
4 ventilated braking band
5 second disc-shaped portion
6 second plate
7 third portion
8 ventilation spacer
9 first protrusions
10 second protrusions
11 first recesses
12 second recesses
13 ventilation channels
14 discontinuous weld spots
15 inner radial extensions
16 bell
17 central feeding and connecting portion to the wheel hub
18 central bell-shaped portion)
19 bosses or punctiform portion in relief and/or recessed
20 flat end portions of protrusions
21 first passage openings
22 second passage openings
23 third passage openings
24 welding studs
25 welding electrode
26 braking surface
27 braking surface
28 prevailing extension welding tip to enter plate opening)
29 small extension welding tip to enter into contact with plate
30 bell braking band connecting and feeding devices
31 half-die
32 half-die
33 annular welding plates or annular electrode
34 boss housing
X-X rotation axis
A-A axial direction
R-R radial direction
C-C tangential direction
D1 inner band diameter
D2 outer band diameter

The invention claimed is:

1. A method for manufacturing a brake disc, said method comprising:
providing at least one sheet of predefined thickness;
blanking a first disc-shaped portion in said at least one sheet, adapted to make a first plate of a ventilated braking band;
blanking a second disc-shaped portion in said at least one sheet, adapted to make a second plate of said ventilated braking band;
blanking a third portion in said at least one sheet, adapted to make at least one ventilation spacer for said ventilated braking band;
drawing said third portion by shaping, along a circular path along said third portion, first and second protrusions, forming opposite first and second recesses, adapted to make ventilation channels for said ventilated braking band;
wherein
a step of stamping and/or drawing bosses in said first and/or second disc-shaped portion and/or ventilation spacer is provided either simultaneously with or subsequently to said blanking steps to form recesses and/or raised portions suited for localized and/or spot welding;
connecting said first disc-shaped portion to said first protrusions by discontinuous weld spots at said bosses; and
connecting said second disc-shaped portion to said second protrusions by discontinuous weld spots at said bosses.

2. The method of claim 1, wherein said at least one sheet is made of steel suited for brake disc applications.

3. The method of claim 1, wherein said at least one sheet is made of stainless steel suited for brake disc applications.

4. The method of claim 1, wherein a bell associated with said ventilated braking band is provided and wherein said bell is made of a material different from the material of said ventilated braking band.

5. The method of claim 4, wherein said bell is made of aluminum.

6. The method of claim 4, further comprising a step of drilling and processing the bell at least in a surface thereof adapted to cooperate with a supporting stub axle of the brake disc of a vehicle.

7. The method of 1, wherein
at least one of said blanking steps is a circular crown blanking; and/or wherein
at least one of said blanking steps is a circular crown blanking with inner radial extensions for connecting to a bell for connecting to a stub axle of a vehicle and/or a central feeding and connecting portion to a wheel hub; and/or wherein
at least one of said blanking steps is a blanking of a full disc, and wherein
a step of drawing a central bell-shaped portion for connecting to a stub axle of the vehicle is provided either at the same time as or subsequently to said blanking; and/or wherein
the step of stamping and/or drawing bosses in said first and/or second disc- shaped portion is provided either at the same time as or subsequently to said blanking and wherein the step of making said bosses is provided in points in which discontinuous spot welding is provided.

8. The method of claim 1, wherein said first and second protrusions comprise at least some flat end portions, said method further comprising placing said first and/or second disc-shaped portion over said at least some flat end portions.

9. The method of claim 1, wherein said first and second protrusions comprise at least some flat end portions, said method further comprising placing said bosses of said first and/or second disc-shaped portion over said at least some flat end portions.

10. The method of claim 1, further comprising making first and/or second passage openings for welding electrodes and/or welding studs either at the same time as or separately from the step of blanking the first and/or second disc-shaped portion in said at least one sheet.

11. The method of claim 1, wherein:
said step of connecting said first and/or second disc-shaped portion to said first and/or second protrusions by discontinuous weld spots comprises a step of capacitive welding; or wherein
said step of connecting said first and/or second disc-shaped portion to said first and/or second protrusions by discontinuous weld spots comprises a step of capacitive spot welding; or wherein
said step of connecting said first and/or second disc-shaped portion to said first and/or second protrusions by discontinuous weld spots comprises a step of simultaneous welding with a plurality of welding electrodes which simultaneously make a plurality of said discontinuous weld spots; and/or wherein
the step of making first and/or second passage openings for welding electrodes is provided either at the same time as or separately from said step of blanking a first and/or second disc-shaped portion in said at least one sheet; and wherein the step of making said at least some welding electrodes enter through said first and/or second passage openings for welding electrodes is provided;
or wherein
said step of connecting said first and/or second disc-shaped portion to said first and/or second protrusions by discontinuous weld spots, comprises a step of welding with a pair of annular electrodes or welding plates or annular welding plates, adapted to rest on the first and second plates and to create a potential difference adapted to determine spot welding in contacts between the first and second plates and the ventilation spacer at the bosses.

12. The method of claim 1, further comprising:
approaching the first disc-shaped portion to said third portion forming said ventilation spacer and approaching said second disc-shaped portion to said ventilation spacer on an opposite side of said ventilation spacer;
placing at least one first welding electrode on the first or second disc-shaped portion;
providing a step of making first or second passage openings for welding studs either at the same time as or separately from said step of blanking a first or a second disc-shaped portion in said at least one sheet;
entering with at least one second welding electrode in electrode openings provided in said second or first disc-shaped portion and placing said ventilation spacer said at least one second welding electrode; and
connecting by weld spots said ventilation spacer to said first or second disc-shaped portion; wherein connection is a welding and a capacitive welding.

13. The method according of claim 1, further comprising
approaching the first disc-shaped portion to said third portion forming said ventilation spacer and approaching said second disc-shaped portion to said ventilation spacer on an opposite side of said ventilation spacer;
providing a step of making first and second passage openings for welding studs either at the same time as or separately from said step of blanking a first and a second disc-shaped portion in said at least one sheet;
entering with at least one first welding electrode into electrode openings provided in said first disc-shaped portion and placing said ventilation spacer said at least one second welding electrode;
entering with at least one second welding electrode in electrode openings provided in said second disc-shaped portion and placing said ventilation spacer said at least one second welding electrode; and
connecting by weld spots said ventilation spacer to said first and second disc-shaped portions, wherein connection is a welding and a capacitive welding.

14. The method of claim 1, further comprising, after said step of connecting by weld spots, working said first and second disc-shaped portions to take into tolerance at least one portion of an outer surface of the ventilated braking band whereby forming opposite braking surfaces of the first and second plates.

15. The method of the claim 1, wherein:
at least one of said blanking steps is a circular crown blanking whereby making said second disc-shaped portion; and/or wherein
at least one of said blanking steps is a circular crown blanking with inner radial extensions whereby making said second disc-shaped portion; said method further comprising
approaching the first disc-shaped portion to said third portion forming said ventilation spacer and approaching said second disc-shaped portion to said ventilation spacer on an opposite side of said ventilation spacer;
connecting by said weld spots said ventilation spacer to said first or second disc-shaped portion whereby making a ventilated braking band;
inserting said inner radial extensions into a cavity of a die; and
providing a step of co-casting a bell which, when solidified, with a peripheral portion thereof embraces at least in part said inner radial extensions to connect said bell to said ventilated braking band allowing a radial thermal expansion movement of the ventilated braking band with respect to said bell.

* * * * *